United States Patent Office 3,539,526
Patented Nov. 10, 1970

3,539,526
TERNARY EUTECTIC DIMETHACRYLATE MONOMER SYSTEM AND RESTORATIVE DENTAL MATERIAL PREPARED THEREFROM
Rafael L. Bowen, Bethesda, Md., assignor to the United States of America as represented by the Secretary of the Department of Health, Education, and Welfare
No Drawing. Filed Jan. 30, 1968, Ser. No. 701,539
Int. Cl. C08f 3/66; C07c 69/76
U.S. Cl. 260—41                                    10 Claims

ABSTRACT OF THE DISCLOSURE

A stable liquid component of a direct dental filling material comprising as a formulation ingredient a ternary eutectic monomer mixture of three isomeric polyesters that are each dimethacrylate derivatives produced by the separate interaction of 2 molar amounts of 2-hydroxyethyl methacrylate (HEMA) for each 1 molar amount of terephthaloylchloride, isophthaloylchloride and phthaloylchloride respectively. Preferably the liquid ternary eutectic is mixed with an inorganic particulate solid filler such as silane-treated fused silica and a preferred free-radical-generating initiator such as benzoyl peroxide or lauroyl peroxide, or both, to produce a novel dental filling composition. A preferred formulation of an isomeric eutectic monomer is as follows, and variation of the components may be $\mp 10\%$ and still be in the operable range.

I. LIQUID (A) Major ingredients: Parts by weight
  HEMA-isophthalate (meta) _____ 46
  HEMA-phthalate (ortho) _____ 37
  HEMA-terephthalafe (para) _____ 15
(B) Minor ingredients consisting of antioxidants, stabilizers, non-discoloring inhibitors and accelerators:
  Permasorb MA® (SNC Corp. 3,162,676), an ultraviolet absorber and stabilizer _____ 2
  N,N-dimethyl - 3,5 - dimethylaniline (DMDA), accelerator _____ 0.5
  Tenox® BHT (Eastman), an antioxidant and inhibitor _____ 0.2
  Di-tert.-butyl sulfide, an antioxidant _____ 0.1

II. POWDER

A preferred, substantially inorganic reinforcing filler for use with the monomer comprising fine spheroidal particles of silane-treated vitreous silica and special glass formulations having low coefficients of thermal expansion, a degree of X-ray opacity, and a refractive index that nearly matches that of the polymer matrix that is subsequently formed by the polymerization of the preferred eutectic monomer formulation. Less suitable organic fillers or inorganic fillers with or without a silane treatment can be used, in the form of rods, fibers, flakes or irregular particles.

Note.—The formula above covers the preferred ingredients. Alternatives are described post in the text.

DISCLAIMER STATEMENT

The issuance of this patent does not necessarily place a stamp of approval by the United States Government and particularly by the United States Patent Office as to safety and/or efficacy of the products and processes of this invention.

The compositions of the present invention have utility as monomer and final resin components in direct dental filling materials.

In the modern development of synthetic, direct dental filling materials, effort has been made to find an insoluble synthetic resin material that has aesthetic qualities, is tasteless or has a pleasant taste, is non-toxic under conditions of use and is not irritating to the dental pulp tissues or to the mouth of the patient. Such materials are utilizable in direct filling materials, and also in dental adhesive materials, prosthetic materials and in other applications. The acrylates and methacrylates, and in particular the esters thereof, have developed as preferred materials in this field due to the qualities which they exhibit such as stability, resistance to discoloration in ultraviolet-containing light, and resistance to aging and heat.

Due to the low molecular weight of most reactive methacrylates of the prior art, such as methylmethacrylate commonly used in dentistry, there is a proportionately high volumetric shrinkage that accompanies the hardening (polymerization) process and an accompanying poor adaptation to the dental cavity walls. This situation has been improved by the use of higher-molecular-weight dimethacrylate monomers and preferred silane-treated reinforcing inorganic fillers. This combination reduces hardening and thermal shrinkage and the tendency to take up water by a process of imbibing. Skinner and Phillips "The Science of Dental Materials," 6th ed., 1967, Saunders, p. 172.

One striking need of the dental profession has been the development of an extremely pure higher-molecular-weight liquid dimethacrylate monomer for utilization in a filled (composite) material. The purity of the monomer is important, since it is well known that pure methacrylate monomers yield polymers that are less likely to discolor than those produced from impure monomers. Furthermore, the viscosity of such pure dimethacrylate monomers must be low enough so that it can be mixed with a maximum amount of the finely-divided inorganic reinforcing fillers while retaining a plastic consistency; the viscosity should, nonetheless, be as high as feasible so that the polymerization shrinkage will be minimal. As a first approximation, the hardening shrinkage is inversely proportional to the viscosity of the monomer. Dimethacrylate monomers having this combination of extreme purity, optimum molecular weight and viscosity have not been provided or taught by prior art.

PRIOR ART

The following patents are cited generally to show the state of the prior art: 2,558,139, Knock (L. D. Caulk Co.); 2,569,767, Knock (L. D. Caulk Co.); 2,794,016, Glenn et al. (L. D. Caulk Co.); 3,066,112, R. L. Bowen; 3,194,783, R. L. Bowen; 3,194,783, R. L. Bowen.

The following disclosure constitutes the best art known to applicant:

British, 595,881 (ICI Limited) Example 3 teaches the preparation of one of the compounds of the eutectic monomer composition, namely di-(methacrylyl glycol) phthalate. No suggestion or teaching is given as to the utilization of the present isomeric eutectic triumvirate of the present invention.

One dimethacrylate of prior art (3,066,112), which is now being used by numerous manufacturers of dental materials and in other applications, is the adduct of methacrylic acid and the diglycidylether of bisphenol A. This monomer has the disadvantages of (1) a viscosity that is too high for mixing with the reinforcing filler without being thinned with one or more somewhat volatile comonomers, and (2) a lack of the desired extreme purity and colorlessness. It cannot be purified by distillation or by crystallization since it is inherently a mixture of high-molecular-weight optical isomers.

It is therefore an immediate object of the present invention to provide a dimethacrylate, monomeric eutectic liquid of extreme purity and of a suitable viscosity for use without the addition of volatile comonomers.

Another object of the invention is to provide a composite, restorative, direct filling material that will inherently resist the well-known tendency toward discoloration of such materials in the challenging oral environment.

Usually the liquid monomeric resin comprises 30-17% by weight and the reinforcing fillers comprising fused silica, barium-containing glasses, colored glasses, fluorescent pigments, etc., constitute 70 to 83% by weight of the final composition.

The hardening reaction (polymerization of the monomer) is brought about by the amine accelerator bringing about the decomposition of peroxide yielding free radicals that initiate the polymerization (a chain reaction) of the monomers forming polymer that binds together the particles of the inorganic reinforcing filler.

Such composite materials are supplied and packaged in such a manner as to keep the amine accelerator and the peroxide initiator separate. Inhibitors and stabilizers are utilized to prevent premature polymerization of the monomers.

In the example given below, the amine accelerator is contained in the monomeric liquid and the peroxide initiator is dispersed in the reinforcing powder.

PREPARATION AND MIXING OF THE DIMETHACRYLATE PHTHALIC ISOMER

Examples 1, 2 and 3, following, teach the preparation of individual isomer components of the present invention, and the mixing of these isomers is described thereafter.

EXAMPLE 1

Preparation of "HEMA-Isophthalate" (meta isomer)

The synthesis was carried out in a three-neck, round-bottom flask equipped with a cooling bath, stirrer, thermometer, source of dried nitrogen, and a dropping funnel. BHT (butylated hydroxy toluene: 2,6-di-t-butyl-4-methyl phenol) and di-t-butyl sulfide, each equivalent to 0.1% of the theoretical yield of monomer were placed in the round bottom flask. To this was added 194 ml. of pyridine (2.4 moles) and 305 ml. of 2-hydroxyethyl methacrylate (HEMA: 2.4 moles) with stirring. Dried nitrogen was used as the reaction atmosphere and the cooling bath maintained the temperature within the range of 10-35° C. throughout the reaction. Isophthaloyl chlorie (203 gm., 1 mole), dissolved in 112 gm. of acetone, was added dropwise to the stirred reagents in the reaction vessel. As the reaction proceeded, a white precipitate (pyridinium chloride) formed. The acid chloride solution was added over a four-hour period, and then the mixture was allowed to stand, without stirring, overnight. The crystals of pyridinium chloride were removed by vacuum filtration; the residue on the filter was rinsed with additional acetone and was then discarded. This yielded a clear yellow filtrate containing the monomeric product.

The filtrate was washed in a separatory funnel three times with a total of 1500 ml. distilled water, and 300 ml. of chloroform was used to aid in the separation. The resin phase was vacuumed to approximately constant weight yielding a yellow liquid with a refractive index of $$n_D^{23.5°\ C.} = 1.5087$$

The yield of this impure HEMA-isophthalate monomer was slightly over 90% of the theoretical. To it was added additional BHT and di-t-butyl sulfide (0.1% of each). Although the first crystallization in this case was carried out by the addition of seed crystals (previously obtained) and by the stirring at room temperature for the growth of these crystals, a preferred method (especially in the absence of seed crystals) would be by thinning the monomer with about equal volume of methanol and then by cooling, with stirring, to a low temperature, utilizing a dry ice bath. At a low temperature (e.g. about $-20°$ C. $\mp$ 20° C., which depends on the amount of impurities and on the concentration of the monomer with respect to solvent) the crystals will spontaneously form and develop rapidly. This slurry of crystalline monomer, suspended in the liquid solvent that contains the preponderance of impurities, is then suction filtered, the crystals of monomer being retained on a Whatman No. 1 filter paper.

The crystals obtained were redissolved in warm methanol and recrystallized and filtered in the manner just described. They were crystallized a total of four times (recrystallized three times), yielding a colorless white solid having a melting point of 42.3–43.3° C. When melted, the metastable liquid had a refractive index of $$n_D^{2.4°\ C.} = 1.5116$$

and was identified as HEMA-isophthalate.

EXAMPLE 2

Preparation of HEMA-terephthalate (para isomer)

This compound was synthesized in essentially the same manner as that described previously for HEMA-isophthalate in Example 1, with the following exceptions. Since the terephthaloyl chloride was less soluble in acetone, a larger quantity of acetone was required as a solvent or the solution was warmed, or both.

After recrystallizing four times as previously described, the white crystalline HEMA-terephthalate had a melting point of 50–53° C., and the refractive index of the metastable liquid (measured immediately after melting) was $n_D^{22.3°\ C.} = 1.5135$. The yield was greater than 55% (first crystallization).

EXAMPLE 3

Preparation of HEMA-phthalate (ortho isomer)

This monomer was synthesized in essentially the same manner as the isomers previously described in Examples 1 and 2, with the exception that no acetone was used in the synthesis, since the phthaloyl chloride is a liquid at room temperature and could, therefore, be added dropwise to the reaction flask without a solvent.

After recrystallizing four times as before, the colorless, white crystals of HEMA-phthalate had a melting point of 39–40° C.; the refractive index of the metastable liquid (measured immediately after melting of some of these crystals) was $n_D^{22.3°\ C.} = 1.5095$. The yield was approximately 80% of theoretical at the time of the first crystallization.

Mixing and formulation

It was discovered that the three solid, crystalline monomers could be mixed together, each thereby depressing the melting points of the others sufficiently so that at or near the ternary eutectic proportions, the ternary eutectic temperature is below normal room temperature thereby yielding a clear, colorless liquid.

One method of mixing the three dimethacrylate phthalic monomers to produce the eutectic mixture is to melt each individually in the presence of the mentioned stabilizers and mixing together these molten ingredients in the proper proportions, whereupon the mixture will not recrystallize at room temperature. However this entails the risk of some polymerization due to the heating, i.e., to the raised temperature involved. When the three monomers are melted together at an elevated temperature, there is an increased risk of some premature polymerization.

Another method of mixing the three crystalline monomeric materials is to mechanically stir together the predetermined amounts of the crystalline isomers at room temperature whereupon they will spontaneously form a liquid solution. The disadvantage of this method is the prolonged period of time necessary for the complete solvation or dissolving of one or more of the crystalline solid monomers.

A preferred method of mixing together the three solid recrystallized monomer components is to add them, at normal temperature, in predetermined amounts, to a volatile solvent, for example diethyl ether, such volatile solvent containing the required polymerization stabilizers. The volatile solvent can then be removed from the liquid mixture under reduced pressure by methods already known to the art.

The amine accelerator and remaining additives, if any, can then be added as desired to give the formulated liquid.

Subsequently, mixing of the formulated monomer liquid with a powder comprising a reinforcing filler and peroxide initiators is used to produce a direct dental filling material. This can either be done by the dentist when he wishes to place the mixture in the cavity, or alternatively the manufacturer can supply a paste, or two or more pastes, that can be mixed together by the dentist, providing that the initiator peroxide components are kept separate from the amine accelerator until approximately 3 or 4 minutes before the hardening or polymerization is desired. Again, the tertiary amine accelerator, however the formulation is supplied, must be kept separate from the peroxide until a few minutes prior to the desired polymerization of the monomer.

Alternatively, the monomer can be mixed with the inorganic powder that does not contain the initiator or accelerator, these latter being added separately to a paste of monomer and reinforcing filler by the dentist when he is desirous of the mixture hardening in the subsequent few minutes.

The present invention is useful to the dentist and his patients inasmuch as it provides a more stable liquid monomer that can be made more pure by recrystallizations of its individual components, and thus less prone to discolor than other products on the market today. It is foreseeable that related esters such as the 3-methacryloxypropyl esters and the 4-methacryloxybutyl esters could be utilizable for purposes of similar eutectic liquid monomer mixtures, but the efficacy of such related compositions has not been shown.

Additionally, analogous isomers might be prepared from the three phthalic acid chloride isomers and hydroxypropylmethacrylate (HPMA) which cannot be purified by crystallization. However, the HPMA-phthalates might find uses where purity and colorlessness are less important and resistance to freezing (crystallization) of the monomer is more important.

Toxicity evaluation of the monomer according to claim 3 and the formulation of the abstract by standard pharmacological tests on animals (adult male albino rats) showed the formulation to have extremely low toxicity; the results are set out more broadly in Example 4. The preferred specific example is given in the formulation of the ternary eutectic dimethacrylate moiety in Example 4.

In the following paragraphs, alternatives for the preferred minor ingredients are indicated.

Permasorb MA®, National Starch & Chemical Corporation, is described in 3,162,676 as an ultraviolet light absorber. Chemically this compound is stated as a benzophenone type compound and is specifically 2-hydroxy-4-(2 - hydroxy - 3 - methacryloxy) propoxy benzophenone. This material can copolymerize with the formulation, thus becoming an integral part of the polymer network. Alternative ultraviolet absorbers are well known to the art and include 2-hydroxy-4-alkoxybenzophenones, cyanoacrylate and salicylate derivatives and other compounds.

N,N-dimethyl-3,5-dimethylaniline (DMDA) is useful as a polymerization accelerator, It appears to permit less discoloration than occurs when conventional accelerators are used. Better known, but less satisfactory compounds, include N,N-dimethyl-p-toluidine and N,N-dimethylaniline. The subject is discussed in "Diminishing Discoloration in Methacrylate Accelerator Systems," R. L. Bowen and H. Argentar, JADA vol. 75, No. 4, October 1967, pp. 919–923.

The sterically hindered phenol, butylated hydroxytoluene (BHT) has a very low order of toxicity; specifically Tenox BHT utilized is 2,6-di-tertiary-butyl-paracresol. Other operable stabilizers or antioxidants include hydroquinone, the monomethyl ether of hydroquinone, butylated hydroxy-anisole and certain aromatic primary or secondary amines. The BHT compound is preferred because it gives less discoloration to the resulting material.

Sulfide antioxidants are reported in the literature to be most effective if the sulfur atom is attached to one or more bulky groups such as derived from the tertiary carbon atom. The duality of antioxidants including the preferred phenolic Tenox BHT coupled with the sulfide are reported in the literature to give a synergistic effect and therefore both components are preferred for the formulation. Alternative sulfides include tertiary dodecylthioethanol, thiodipropionic acid esters including thiodipropionic acid-dimethylacrylic acid-di-(alkyldiol)-tetraesters and 2-hydroxy-3-methacryloxy-t-dodecylsulfide.

EXAMPLE 4

Monomer formulation and toxicity evaluation

One formulation of the selected monomers was as follows:

| | Weight Percent |
|---|---|
| HEMA-isophthalate (meta isomer) | 45.6 |
| HEMA-phthalate (ortho isomer) | 36.8 |
| HEMA-terephthalate (para isomer) | 14.54 |
| Permasorb MA® (Natl. Starch & Chemical Corp. 3,162,676) (a UV absorber and stabilizer) | 2.18 |
| N,N-dimethyl - 3,5 - dimethylaniline (DMDA) (accelerator) | 0.54 |
| Tenox® BHT (a food-grade antioxidant and inhibitor, Eastman Chemical Products, Inc.) | 0.20 |
| Di-tert-butylsulfide (an antioxidant) | 0.14 |
| | 100.00 |

This formulation was evaluated for acute oral toxicity by gastric intubation to groups of two adult male albino rats at graded dosage levels of 1.0, 3.16, 10.0 and 31.6 ml./kg. of body weight. The acute oral median lethal dose of the material for albino rats is 31.6 ml./kg. of body weight; therefore, it is considered to be relatively harmless by the oral route.

The test material was also evaluated for acute eye irritation by a single application of 0.1 ml. of the test material into the eyes of three albino rabbits. No irritation was produced in one eye, and only slight conjunctival redness was produced in two eyes which subsided by 72 hours or 4 days. The test material is considered to be essentially nonirritating to the rabbit eyes.

EXAMPLE 5

Powder formulation—inorganic filler

An example of a typical powder comprising an inorganic reinforcing filler suitable for use in combination with the liquid formulation of Example 4 is as follows:

(A) Major Ingredients:  Parts by weight

| | |
|---|---|
| Fused (vitreous) silica spherical particles 5–50 microns in size | $65 \mp 10$ |
| Barium-containing glass [1] (vide infra) having a $n_D{}^{25}=1.55 \mp 0.02$ and a very fine particle size, predominantly smaller than 5 microns in size, preferably spherical in shape | $28 \mp 10$ |
| Amber glass or other colored glasses or both, as necessary for matching the color of natural teeth | $5 \mp 5$ |

See footnote in column 7.

(B) Minor ingredients:               Parts by weight
    Benzoylperoxide or lauroylperoxide or preferably both _____ 1.0∓0.5
    Inorganic fluorescent materials (e.g. Ottalume 2115®; Ottawa Chem. Co. 2,481,-344) _____ 1.0∓1.0

NOTE.—All of these powder ingredients, with the exception of the peroxide initiators are treated with a silane coupling agent; e.g. 3-methacryloxypropyl-tris-(methoxy) silane and the like so as to confer to these powders hydrophobic (water-repellent) characteristics, which treatment is well known to the art.

[1] The barium-containing glass (vide ante) can be prepared by melting together at a minimum temperature (1100–1300° C.) and for a minimum time (about 1 hour) necessary to obtain a homogeneous molten glass, the following glass-making ingredients:

| | Parts in mol percent |
|---|---|
| $SiO_2$ | 44 |
| $BaF_2$ | 28 |
| $Al_2O_3$ | 12 |
| $B_2O_3$ | 16 |
| | 100 |

This glass can be melted, quenched and finely ground by means well known to the glassmaking art.

What is claimed is:

1. A stable liquid component for a direct dental filling material comprising a major amount of a ternary eutectic monomer mixture of HEMA-isophthalate, HEMA-phthalate and HEMA-terephthalate and minor effective amounts of polymerization inhibitors (stabilizers) and a polymerization accelerator.

2. A stable liquid component for a direct dental filling material comprising a major amount of a ternary monomer mixture of HEMA-isophthalate, HEMA-phthalate and HEMA-terephthalate and minor effective amounts of polymerization inhibitors (stabilizers) and a polymerization accelerator, wherein the HEMA-isophthalate and HEMA-phthalate isomers are present in approximately predetermined equal amounts, which amounts are approximately 2½ to 3 times the molar amount by weight of the HEMA-terephthalate present.

3. A stable liquid component for a direct dental filling material, wherein the ingredients are about ∓10% an ingredient formulation as follows:

(A) Major ingredients:               Parts by weight
    HEMA-isophthalate (meta isomer) _____ 46
    HEMA-phthalate (ortho isomer) _____ 37
    HEMA-terephthalate (para isomer) _____ 15

(B) Minor components consisting of antioxidants, polymerization suppressors and accelerator:
    2-hydroxy-4-(2-hydroxy-3-methacryloxy) propoxy benzophenone _____ 2
    N,N-dimethyl-3,5-dimethylaniline (DMDA) ___ 0.5
    2,6-di-tertiary-butyl-para-cresol _____ 0.5
    Di-tert-butyl sulfide _____ 0.1

4. A direct dental filling material comprising the stable liquid eutectic component of claim 1 and an inorganic solid reinforcing filler.

5. A material according to claim 4, containing additionally a free-radical type polymerization initiating agent.

6. A direct dental filling material according to claim 5, wherein such free radical initiating agent is selected from the group consisting of lauroyl peroxide and benzoyl peroxide.

7. A direct dental filling material according to claim 4, wherein the inorganic solid reinforcing filler is fine, spheroidal particles of vitreous silica combined with very fine particles of glass prepared from 44·$SiO_2$, 28·$BaF_2$, 12·$Al_2O_3$ and 16·$B_2O_3$, each in mole percent.

8. A direct dental filling material according to claim 7, wherein the solid filler has been made water-repellant by treatment with a silane, and said filler is present in the composition in a substantially greater amount than the dimethacrylate ternary eutectic mixture.

9. A direct dental filling material comprising the stable liquid component of claim 3 and an inorganic solid reinforcing filler.

10. A process of preparing a direct dental filling material which comprises mixing HEMA-isophthalate, HEMA-phthalate and HEMA-terephthalate in eutectic proportions by weight in the presence of a polymerization inhibitor, adding a polymerization accelerator to produce a liquid dimethacrylate monomer moiety and combining the moiety with a greater amount of a reinforcing inorganic filler containing a free-radical-generating initiator.

References Cited
UNITED STATES PATENTS

| | | |
|---|---|---|
| 2,399,285 | 4/1946 | Muskat. |
| 2,423,042 | 6/1947 | Muskat. |
| 2,928,804 | 3/1960 | Foster. |
| 3,367,992 | 2/1968 | Bearden. |

FOREIGN PATENTS

| | |
|---|---|
| 595,881 | Great Britain. |
| 607,888 | Great Britain. |

MORRIS LIEBMAN, Primary Examiner

P. R. MICHL, Assistant Examiner

U.S. Cl. X.R.

106—35; 260—78.5, 475